United States Patent

[11] 3,618,861

| [72] | Inventor | Allen B. Holmes<br>Rockville, Md. |
|---|---|---|
| [21] | Appl. No. | 2,700 |
| [22] | Filed | Jan. 14, 1970 |
| [45] | Patented | Nov. 9, 1971 |
| [73] | Assignee | The United States of America as represented by the Secretary of the Army |

[54] DIVERTER VALVE FLOW THROTTLE
10 Claims, 4 Drawing Figs.

[52] U.S. Cl. ............................................. 239/265.27,
60/232, 239/265.13, 239/265.29, 244/52
[51] Int. Cl. .................................................. B64c 15/04
[50] Field of Search .......................................... 239/265.11,
265.13, 265.17, 265.27, 265.29; 60/232; 244/52

[56] References Cited
UNITED STATES PATENTS

| 2,774,554 | 12/1956 | Ashwood et al. | 239/265.29 |
| 2,943,444 | 7/1960 | Baxter | 239/265.17 |
| 2,947,501 | 8/1960 | Flint | 239/265.29 |
| 3,380,660 | 4/1968 | Markowski | 239/265.27 |
| 3,474,966 | 10/1969 | Holmes | 239/265.13 |

*Primary Examiner*—Lloyd L. King
*Attorneys*—Harry M. Saragovitz, Edward J. Kelly, Herbert Berl and J. D. Edgerton ABSTRACT: A diverter valve flow throttle for controlling the flow of the high-velocity exhaust gases of a turbojet engine in V/STOL aircraft. In a first embodiment, the diversion is performed by a single rotating vane that blocks the flow of gases only in the fan mode. Leakage to the fan duct is impossible during the jet mode due to the high-velocity, low-pressure area developed at the opening of the duct. In a second embodiment, fluidic techniques are utilized to divert the exhaust gas flow without the use of any mechanical vanes. The frictional losses in the tailpipe due to the extremely high velocities of the exhaust stream are compensated for by a series of vents located in the tailpipe duct which admit a secondary flow of air to the main jet flow. The adjustable vents also provide constant engine speed throttling and control as an aid during conversion.

INVENTOR,
ALLEN B. HOLMES

DIVERTER VALVE FLOW THROTTLE

RIGHTS OF GOVERNMENT

The invention described herein may be manufactured, used, and licensed by or for the United States Government for governmental purposes without the payment to me of any royalty thereon.

BACKGROUND OF THE INVENTION

The present invention relates generally to diverter valves and more specifically to a diverter valve in combination with a flow throttle for particular use in supersonic vertical/short takeoff and landing (V/STOL) aircraft where there is needed an effective and efficient method of diverting the flow of hot gases operating at relatively high velocities.

A diverter valve is needed in V/STOL aircraft to direct the flow of propulsion gases to alternate ducts; that is, the gases are directed to a vertical duct to operate a fan while the aircraft is in the hover mode and to a horizontal duct to propel the aircraft while it is operating in the jet mode. Such aircraft require a highly efficient valving system whereby the high-velocity propulsion gases will proceed out the desired duct only. Examples of prior art in this area can be found in U.S. Pat. Nos. 2,947,499 to Douglas and 2,947,501 to Flint both of which show an upper and a lower hinged vane in the exhaust pipe of a jet engine that are synchronously controlled to seal off the whereby the high-velocity propulsion gases will proceed out the desired duct only. Examples of prior art in this area can be found in U.S. Pat. Nos. 2,947,499 to Douglas and 2,947,501 to Flint both of which show an upper and a lower hinged vane in the exhaust pipe of a jet engine that are synchronously controlled to seal off the axial pipe or the vertical pipe depending on whether the hover mode or the jet mode, respectively, is desired. The exhaust gases are actually diverted only about 5 percent of the time; that is, when the aircraft is either taking off or landing and the hover mode is desired. Conversely, the jet mode of operation is in use approximately 95 percent of the time during which the exhaust gases are not diverted, but simply proceed out the axial pipe to provide jet thrust. It is critical during this time that the lower vane effectively seals the vertical duct from the high-velocity exhaust gases in order to maintain a high-efficiency jet thrust.

Serious problems arise in such diverter valve systems, because the high-exhaust gas temperatures tend to warp and crack vital metal parts such as the aforementioned vanes, thus causing leakage into the vertical fan duct. Since the fan cavities remain enclosed during the jet mode of flight, such leakage causes excessive heating of the components in the cavities which requires an extraordinary maintenance schedule for repair and replacement of damaged parts.

An attempt to overcome the problems encountered with the use of mechanical movable vanes in such diverter valves was made by applicant using fluid amplifier or fluidic techniques. The fluidic diverter valve used was a bistable device having two circular flow output passages, two control input channels, and one axis-symmetric power nozzle. The device used the wall attachment (Coanda) effect to direct a stable flow to one of the output passages. When a suitable flow was introduced through the control input in the attachment wall, the power was deflected to the other output. The development of this device, however, was accompanied by a very serious problem. Fluidic valves demonstrated an inability to preserve the momentum of the flow between the supply and discharge ports due primarily to frictional losses that occur when flow is transported from the inlet to the exhaust ports, resulting in decreased valving efficiency. Ideally, maximum energy recovery will be achieved in such valves when the jet flow is transported to the output port at low velocities because the frictional pressure drop along the walls of the flow transport channel increases with the square of the velocity. One method for reducing flow velocities in the fluidic valve would be by "loading" the output ports; that is, by reducing the area of the discharge port in relation to the area of the transport channel. However, loading a fluidic device significantly alters its switching characteristics, and this factor offsets any increase in the efficiency of the device. Valving efficiency for this purpose is defined as:

$$N = T_o/T_n \quad X \quad (1)$$

where:

$T_n$ = isentropic thrust that could be computed for a fully optimized supply nozzle and, $T_o$ = measured thrust generated by the expulsion of gases from the output port.

Experiments with the aforesaid fluidic valve have shown that only rarely will the recoverable thrust exceed 75 percent of the computed isentropic value. While such an efficiency may be tolerable in some applications, it is not suitable in aircraft propulsion systems.

Additionally, those skilled in the art will appreciate the desirability of maintaining a constant engine speed during conversion from the jet mode to the fan mode while preparing to land the aircraft. Currently employed methods utilize devices known as "thrust spoilers" which are a pair of pivotable flaps located at the exit area of the two jet exhausts and which, during conversion, are extended from the body of the aircraft so as to deflect the exhaust stream from its normal axial thrust and thus slow down the aircraft while maintaining full throttle. When such devices are used during conversion, the aircraft becomes subjected to severe pitch and yaw whenever the dual deployment is in any way unsymmetrical or when the two jet exhausts are producing unequal thrusts, which are all too frequent occurrences.

It is additionally known that jet engines operate at maximum efficiency under constant r.p.m. and flow conditions. However the forward thrust in such V/STOL aircraft is presently controlled by a complex engine control system that has a relatively slow response and requires that the engine be designed for a wide range of operating conditions, thus inherently reducing its maximum efficiency.

Therefore a primary object of the present invention is to provide a diverter valve flow throttle for diverting the flow of high-temperature, high-velocity gases in which there will be no flow leakage while in the jet mode of operation and which maintains a high valving efficiency while eliminating thermal damage to the components in the vertical fan cavities.

Another object of the present invention is to provide a diverter valve flow throttle for use in V/STOL aircraft that allows operation and conversion at maximum efficiency under constant engine flow conditions.

A further object of the present invention is to provide a diverter valve throttle that permits operation at very low duct pressures while maintaining the required axial thrust.

A further object of the resent invention is to provide a highly efficient fluidic diverter valve with no movable vanes therein for redirecting the flow of hot exhaust gases in V/STOL aircraft.

An additional object of the present invention is to provide a diverter valve flow throttle that eliminates the need for complex engine speed control systems thus allowing the jet engine to operate at maximum efficiency.

SUMMARY OF THE INVENTION

Briefly, in accordance with the invention a diverter valve flow throttle is provided to control the flow of the high-velocity exhaust gases of a turbojet engine, finding particular application in vertical/short takeoff and landing aircraft where conversion is required from a fan mode to a jet mode and vice versa. The present invention solves the serious problem of valve leakage into the vertical fan cavities by eliminating the covering at the entrance to the fan duct in each of two preferred embodiments. In the first of these, only a single vane is used, primarily for blocking the tailpipe duct during the fan mode. During the jet mode, the said vane is merely rotated to offer least resistance to the flow of the gases to the tailpipe duct, but a high-velocity low-pressure area is created at the entrance to the fan duct which precludes leakage into it. In the second embodiment, fluidic techniques are utilized by providing two control ports to accomplish the diversion without any mechanical vanes. In both embodiments, the frictional losses of the exhaust gases as they travel down the tailpipe due to their extremely high velocities is fully compensated for by providing adjustable vents through which air is entrained by the exhaust gases to boost the thrust according to a well-known physical relationship presented herein. The vents also provide constant engine speed throttling, thus simplifying the engine control system while eliminating the need for "thrust spoilers" during conversion.

BRIEF DESCRIPTION OF DRAWINGS

The specific nature of the invention as well as other objects, aspects, uses, and advantages thereof will clearly appear from the following description and from the accompanying drawings, in which.

DESCRIPTION OF THE PREFERRED EMBODIMENT

Figure 1:
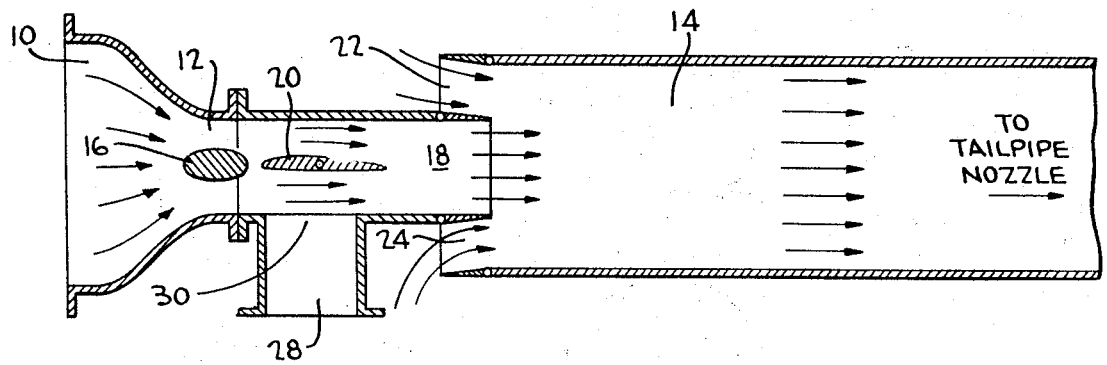
FIG. 1 is a sectional side view of a first preferred embodiment of the diverter valve flow throttle of my invention showing gas flow in a jet mode of operation.

In FIG. 1, which represents with respect to V/STOL aircraft the jet mode of operation, hot exhaust gases enter the valve from a supply chamber 10. A deflector 16 creates an annular nozzle 12 that acts to stabilize the incoming gas flow. A vane 20 is positioned so that gas flow is directed from nozzle 12 through a channel 18 towards a tailpipe duct 14. As the high-velocity, low-pressure gas flow passes down channel 18 into tailpipe duct 14, it aspirates a controllable amount of secondary flow through the adjustable vents 22 and 24 and ejects it through the tailpipe nozzle (not shown) to provide forward thrust. If we represent the engine flow from supply chamber 10 by $m_1$ and the secondary flow entrained through vents 22 and 24 by $m_2$, the final reaction force or thrust F can be expressed by the equation $$F=(m_1+m_2)V \quad (2)$$

where V equals the final exhaust velocity of the combined flows at the tailpipe of the aircraft. By varying the amount of secondary flow $m_2$, it is possible to vary the final thrust F by over a factor of two due to the combined effect of the mass reduction and velocity losses in tailpipe duct 14. Thus it is seen that the vents 22 and 24 act to provide a constant engine speed flow throttle, thus eliminating the costly need for complex engine speed control systems. The need for "thrust spoilers" during conversion can also be eliminated since reduction in thrust at full throttle can be accomplished by simply closing off vents 22 and 24 the desired amount just prior to fan mode conversion.

Perhaps a more significant improvement is attained with respect to the diverter valve portion of the device. As previously explained, a lower vane is commonly being used at opening 30 of FIG. 1 to seal the fan duct 28 from the gases passing around vane 20, said lower vane being subjected to severe temperature gradients and subsequent damage and leakage. The present invention eliminates the need for any covering whatsoever at opening 30 by providing a higher velocity gas flow from chamber 10 which in turn creates an extremely low-pressure area at opening 30, thus preventing the leakage of gases into fan duct 28. The additional losses of the exhaust gases in tailpipe duct 14 due to the higher velocity flow is compensated for by the secondary mass flow entrained through vents 22 and 24. Thus the reaction thrust available at the tailpipe nozzle can reach and even surpass the level attained by the lower velocity gases in present use. More significantly, the final reaction thrust at the tailpipe nozzle has been experimentally brought up to the level available at the output of channel 18 with the tailpipe duct removed. That is to say, the frictional velocity losses that occur in tailpipe duct 14 as a result of complex shock wave interactions and boundary layer effects is completely compensated for by the device of the present invention in addition to the antileak improvements and increase in diverter valve efficiency for V/STOL aircraft.

Figure 2:
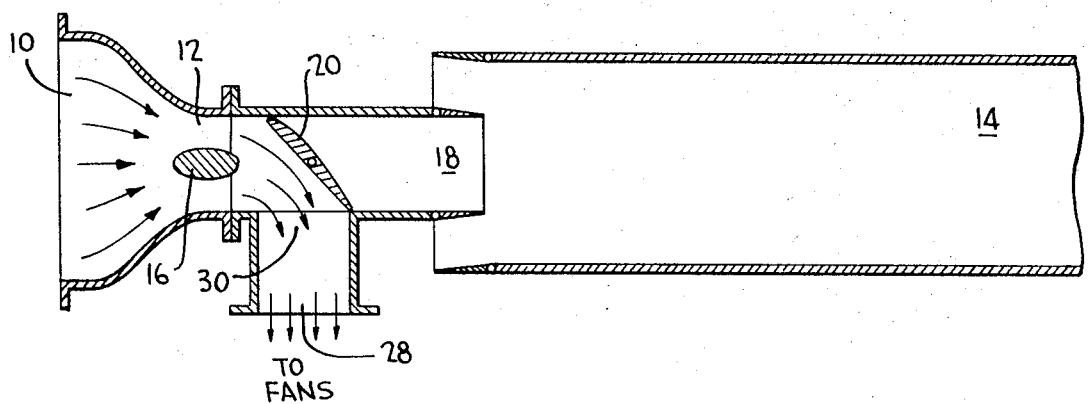
FIG. 2 is a sectional side view of the first preferred embodiment showing gas flow in a hover mode of operation.

FIG. 2 shows the diverter valve flow throttle of FIG. 1 in the hover mode of operation. Vane 20 has been rotated to a diagonal position thereby diverting the gas flow from nozzle 12 through opening 30 and fan duct 28 to the vertical lift fans in the wings of the aircraft (not shown). Leakage that might occur through vane 20 to channel 18 is of relatively little importance, as the hover mode is in use only about 5 percent of the time and since the tailpipe nozzle is in constant difference with ambient air, minimizing any high-temperature damage that otherwise might occur.

Figure 3:
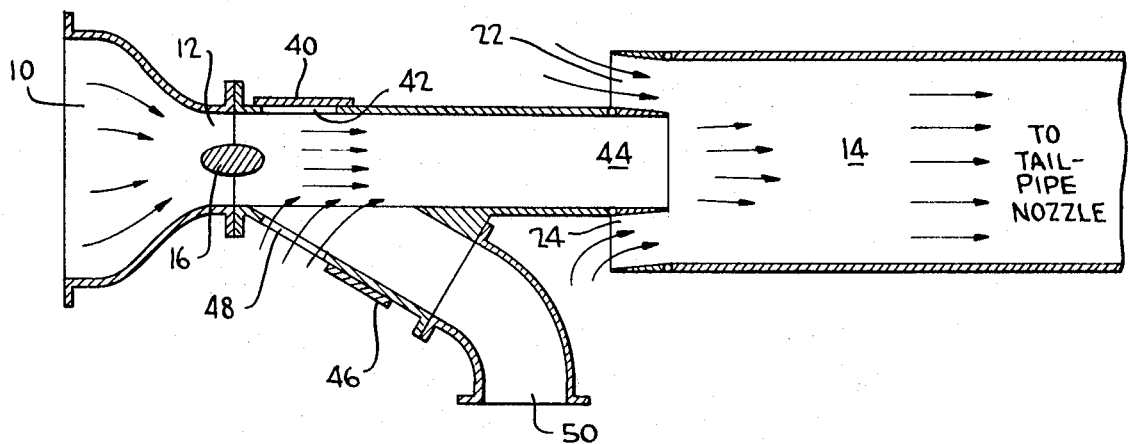
FIG. 3 is a sectional side view of a second preferred embodiment of the diverter valve flow throttle of my invention showing gas flow in a jet mode of operation.
Figure 4:
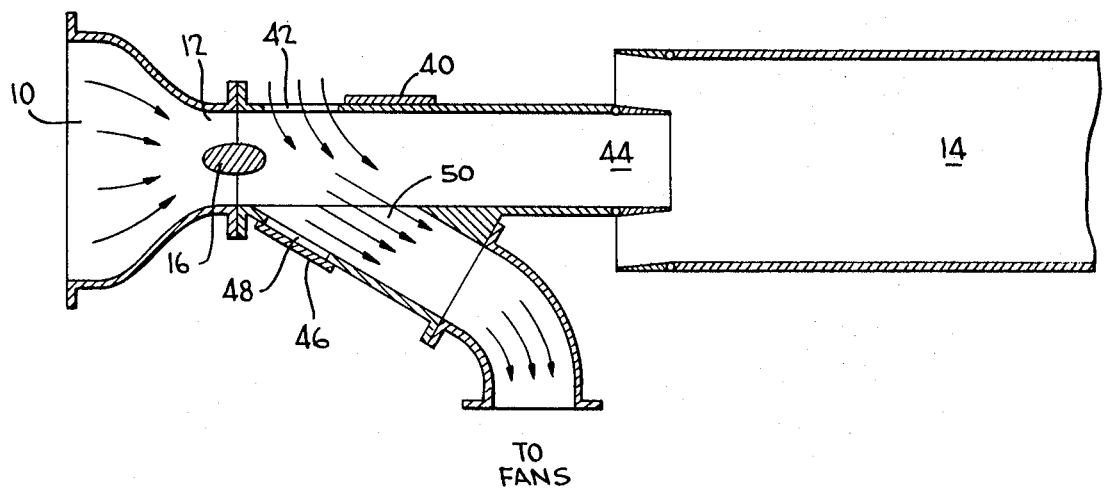
FIG. 4 is a sectional side view of the second preferred embodiment showing gas flow in a hover mode of operation.

The overall operation of the device shown in FIGS. 3 and 4 is similar to that shown in FIGS. 1 and 2. The primary difference is that flow diversion in this second embodiment is achieved without a mechanical deflector or vane. This device embodies the fluidic diverter valve concept as put forth above in the Background section, but solves the problems associated with that device by the inclusion of the flow throttle in the tailpipe duct 14, s explained in greater detail below.

Referring now to FIG. 3, hot gases enter the valve from a supply chamber 10 through annular nozzle 12 formed by deflector 16. Since door 40 is closed and door 46 is open, the gases are forced to enter channel 44. This occurs because of the well-known fluidic phenomenon whereby the essentially atmospheric flow enters opening 48 and forces the main jet stream issuing from nozzle 12 to attach along the upper portion of the valve. As the jet flow leaves channel 44 and enters tailpipe duct 14, it aspirates a controllable amount of air through adjustable vents 22 and 24. This secondary flow is accelerated and discharged along with the primary flow at the end of the tailpipe. As explained above by equation (2) the final reaction force or thrust is equal to the sum of the primary and secondary mass flow multiplied by the average value of the exit velocity of the combined flow. Thus the frictional losses in the tailpipe duct formerly associated with such devices are fully compensated for by the flow throttle of the present invention thereby increasing the forward thrust to the necessary level for efficient V/STOL operation. Leakage of the primary jet flow into vertical fan duct 50 is impossible due to the pressure differential between opening 48 and door 40. Additionally, throttling is easily achieved in the jet mode by reducing the amount of secondary flow entering vents 22 and 24.

FIG. 4 shows the diverter valve flow throttle of FIG. 3 in the hover mode of operation. Door 40 is open, creating an opening 42 to the atmosphere, and door 46 is now closed. In the well-known fluidic manner, the atmospheric flow entering opening 42 forces the jet flow issuing from nozzle 12 to attach along the lower wall of the valve and exit along duct 50. The pressure differential created between opening 42 and door 46 prevents leakage into channel 44. Thus my second embodiment provides a vastly improved, highly efficient diverter valve that does away with failure-prone mechanical vanes while additionally providing a constant engine speed flow throttle which enables the jet engine itself to operate at maximum efficiency and abolishes the need for "thrust spoilers" during conversion from jet mode to fan mode. Additionally, the need for mechanical seals and precision machined parts is completely eliminated.

It should be pointed out that in both of the preferred embodiments, vents 22 and 24 are only exemplary in nature in that, for example, a plurality of such vents circumscribing tailpipe duct 14 could be utilized for entraining the secondary mass flow and controlled by any suitable means well known in the art.

While my invention has been described in the context of its application as a means of diverting high temperature turbo-jet exhaust flows, it will be apparent to those skilled in the art that the device of the present invention may be utilized to great advantage in many other applications. Further, I wish it be understood that I do not desire to be limited to the exact details of construction shown and described, for obvious modifications will occur to a person skilled in the art.

I claim as my invention:

1. A valve for controlling the flow of high-temperature, high-velocity exhaust gases issuing from a turbojet reaction engine in V/STOL aircraft, comprising:
   a. a supply chamber to receive said exhaust gases from said engine;
   b. an annular nozzle in communication with aid supply chamber for passing and stabilizing the gas flow therefrom;
   c. an interaction chamber positioned to receive said exhaust gases from said annular nozzle;
   d. a first channel in a substantially axial alignment with said interaction chamber for receiving said exhaust gases during a first mode of operation;
   e. a second channel in a substantially oblique alignment with said interaction chamber for receiving said exhaust gases during a second mode of operation;
   f. diverting means for controlling the path of flow of said exhaust gases from said interaction chamber whereby mode selection is achieved;
   g. means for providing secondary airflow into said first channel; and
   h. throttling means for varying the amount of said secondary air flow.

2. The invention according to claim 1 wherein said diverting means comprises a rotatable vane located within said interaction chamber to completely block the flow of said exhaust gases into said first channel during said second mode of operation and to permit the flow of said exhaust gases into said first channel during said first mode of operation.

3. The invention according to claim 1 wherein said diverting means comprises a first control port located along the wall leading to said second channel and a second control port located along the wall leading to said first channel, said walls being those of the said interaction chamber, whereby said first mode of operation is achieved by opening said first control port and closing said second control port and whereby said second mode of operation is achieved by closing said first control port and opening said second control port.

4. The invention according to claim 3 wherein said interaction chamber is devoid of any deflecting vanes therein.

5. The invention according to claim 4 wherein said means for providing secondary airflow comprises a series of vents circumscribing said first channel through which said secondary airflow is entrained by the passage of said exhaust gases therein.

6. The invention according to claim 5 further comprising an output nozzle from which issues the combination of said exhaust gases and said secondary airflow for providing forward thrust.

7. The invention according to claim 6 wherein said secondary airflow comprises primarily atmospheric gases.

8. The invention according to claim 2 wherein said means for providing secondary airflow comprises a series of vents circumscribing said first channel through which said secondary airflow is entrained by the passage of said exhaust gases therein.

9. The invention according to claim 8 further comprising an output nozzle from which issues the combination of said exhaust gases and said secondary air flow for providing forward thrust.

10. The invention according to claim 9 wherein said secondary airflow comprises primarily atmospheric gases.

* * * * *